United States Patent
Dawson et al.

(10) Patent No.: US 11,074,345 B2
(45) Date of Patent: Jul. 27, 2021

(54) ROOTKIT DETECTION SYSTEM

(71) Applicant: UT Battelle, LLC, Oak Ridge, IL (US)

(72) Inventors: Joel Dawson, Oak Ridge, TN (US); Ali Passian, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 203 days.

(21) Appl. No.: 16/427,109

(22) Filed: May 30, 2019

(65) Prior Publication Data

US 2020/0380129 A1    Dec. 3, 2020

(51) Int. Cl.
*G06F 21/56* (2013.01)
*G06F 1/28* (2006.01)
*G06F 21/54* (2013.01)

(52) U.S. Cl.
CPC .............. *G06F 21/566* (2013.01); *G06F 1/28* (2013.01); *G06F 21/54* (2013.01); *G06F 2221/033* (2013.01)

(58) Field of Classification Search
CPC .......... G06F 21/566; G06F 1/28; G06F 21/54; G06F 2221/033; G06F 11/1438; G06F 11/1441; G06F 16/00; G06F 21/575; G06F 9/4418; G06N 20/00; G06N 20/10; H04L 63/1416; H04L 63/1425; H04L 63/1458
See application file for complete search history.

(56) References Cited

U.S. PATENT DOCUMENTS

| | | | |
|---|---|---|---|
| 7,877,621 B2 | 1/2011 | Jacoby et al. | |
| 8,332,945 B2 | 12/2012 | Kim et al. | |
| 8,341,758 B2 | 12/2012 | Kim et al. | |
| 8,453,261 B2 | 5/2013 | Morin et al. | |
| 9,262,632 B2 | 2/2016 | Reed et al. | |
| 9,996,694 B2 | 6/2018 | Sethumadhavan et al. | |

(Continued)

FOREIGN PATENT DOCUMENTS

CN    102592068 A6    7/2012

OTHER PUBLICATIONS

Clark, S.S. et al., "WattsUpDoc: Power Side Channels to Nonintrusively Discover Untargeted Malware on Embedded Medical Devices," USENIX Workshop on Health Information Technologies, 2013 (11 pages).

(Continued)

*Primary Examiner* — Abiy Getachew (74) *Attorney, Agent, or Firm* — Lempia Summerfield Katz LLC (57) ABSTRACT

A system and method (referred to as the system) detect infectious code. The system injects a repetitive software code that causes malware in a monitored device to render a detectable direct current power consumption profile. A guide wave generator generates a guide wave signal that establishes an observational window that is applied to data that represent a direct current source power consumption of the monitored device. An extraction device extracts a portion of the data that represent the direct current source power consumption of the monitored device. A deviation engine identifies the malware on the monitored device without processing data associated with a prior identification of the malware or identifying a source of the malware or identifying a location of the malware on the monitored device.

24 Claims, 6 Drawing Sheets

(56) References Cited

U.S. PATENT DOCUMENTS

| | | | | |
|---|---|---|---|---|
| 10,474,813 B1* | 11/2019 | Ismael | ................. | G06F 21/566 |
| 2005/0177327 A1* | 8/2005 | Banginwar | ........... | G06F 1/3203 |
| | | | | 702/60 |
| 2007/0055711 A1* | 3/2007 | Polyakov | ............. | G06F 21/566 |
| 2016/0048682 A1 | 2/2016 | Gou et al. | | |
| 2018/0330091 A1* | 11/2018 | Prowell | ................ | G06F 21/552 |
| 2020/0327255 A1* | 10/2020 | Ngo | ..................... | G06F 21/554 |

OTHER PUBLICATIONS

Hernandez, J.M. et al., "Phase-Space Detection of Cyber Events," 10th Cyber and Information Security Research Conference, Apr. 2015, DOI: 1145/2746266.2746279 (4 pages).

\* cited by examiner

ROOTKIT DETECTION SYSTEM

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

BACKGROUND OF THE DISCLOSURE

Technical Field

This disclosure relates to detecting software designed to disrupt, damage, or gain unauthorized access to a computer.

Related Art

Malware causes a significant economic expense to businesses and users. It corrupts data, destroys memory, steals information, and consumes resources. Some viruses are detected by comparing suspect computer code to known malicious code that disrupts computer functions. Classical antimalware software cannot identify all of the forms, stages, or types of malware. Zero-day exploits, malware evolution, polymorphic code, and even low-level operating system tampering can defeat known detection and preventative methods. Further, known antimalware software must be frequently updated to recognize current and evolving threats.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

Behavior-based malware detection can determine whether software is performing dangerous or unwanted operations—such as the renaming or deleting of electronic files. Unlike traditional code matching systems, the disclosed detection systems may detect granular characteristics about potentially suspicious code by executing a behavior-based analysis. The behavior-based analysis may protect against previously unknown malicious code including code that has been cosmetically modified to avoid detection by code matching systems.

Monitoring systems that rely on data rendered by a host system can run the risk that the data it processes has been tampered with before monitoring even begins. This may even occur when countermeasures are practiced to protect data integrity. Nonetheless, processing of host data is desirable to detect and identify software threats because of the level of detail that the data can provide. By generating and mining newly identified forms of this data—referred to as behavior-based data at the host (e.g., a computer connected to another computer), the disclosed detection methods and the detection systems (referred to as the system or systems) identify software threats that were not previously known or became obfuscated. Further, the systems' use of signal injections provides a data flow model that can be tracked with a monitoring control that automatically observes, supervises, and renders a more accurate and complete reporting and a more secure system.

The detection system is an improvement over known power profile technique. The detection systems do not collect power profile signatures from other monitored devices as is done in some profile-matching systems. Such systems, like known code-matching systems, recognize viruses through comparisons to identify viruses derived from other machines. The detection systems, on the other hand, exceed these systems by harnessing and focusing exclusively on the unique and distinctive operating characteristics and properties of the device it is actually monitoring—providing a very granular and customized security for each device or system. Second, the detection systems require less invasive instrumentation than other techniques and may identify malware or viruses by identifying unstable or infected operating states quickly (e.g., at the same rate the data is received or in real-time). The improved speed and accuracy of the detection systems are produced by analyzing controlled intervals through a data flow model and post-processing (e.g., the monitoring control). The detection systems also isolate signals in hardware and automate model deviations from a baseline operation of the monitored device itself.

In alternate detection systems, the detection system's models train on data when an infection initially occurs but before a complete or partial infection is revealed. These alternate systems generate complete intermediate representations through models of the exposed system that can identify unknown forms of malicious code even before the malicious code causes the device to enter an unsecure state. These models predict potentially infectious devices via prognostication engines without having to identify the malicious code itself or identify what caused the unsecure state or where the infection or malicious code resides or what functions the malicious code is actually executing. The disclosed early detection and in some instances remediation, occurs by detecting and identifying operating states during incubation periods, which occurs after exposures to infectious software code but before symptoms or signs caused by the infectious software code become partially or fully apparent.

When intermediate states (e.g., inoculation periods) or fully infectious states are detected, all of the disclosed systems may stop processing device and server sessions (e.g., the time during which two devices or processes maintain a connection), start another uninfected instance of the infected device, software, and/or server on that node or on another node or network, stop the failing device, software, and/or server (assumes the remaining devices and applications can service demand), place the device, software, and/or server in a maintenance mode, a quarantined state and/or an isolated state, execute another remedial protocol and/or enable a remedial software application or device to remediate the infection through the system's health policies and/or rules that control these functions. The remedial applications and/or devices may define and/or execute the health policies and rules for a single device, the suspected software, suspected server, and/or each device or server in a server cluster, and/or one or more routers in each computing cells or operating node. A user or an IT specialist may define the health policies and/or rules governing the remediation of the one or many devices, software, servers and/or clusters. The health policies may reallocate processing resources and may be enforced automatically (referred to as the monitoring control) by the system in response to the monitored device's behavior or may be delayed by one or more users' (e.g., one or more devices and/or persons) discretion.

The term cluster or server cluster refers to a group of independent network servers that operate and appear to client devices as if they were a single computer. Clustering improve network capacity by, among other things, enabling the servers within a cluster to shift work in order to balance the processing load. By enabling one server to take over for another (e.g., fault tolerance) in response to the monitoring control, clustering also enhances network stability and minimizes or eliminates downtime caused by a device, software, or a server infection. The term router refers to one or more devices that forward data or data packets to a particular destination such as to other devices and/or servers and/or networks.

Figure 1:
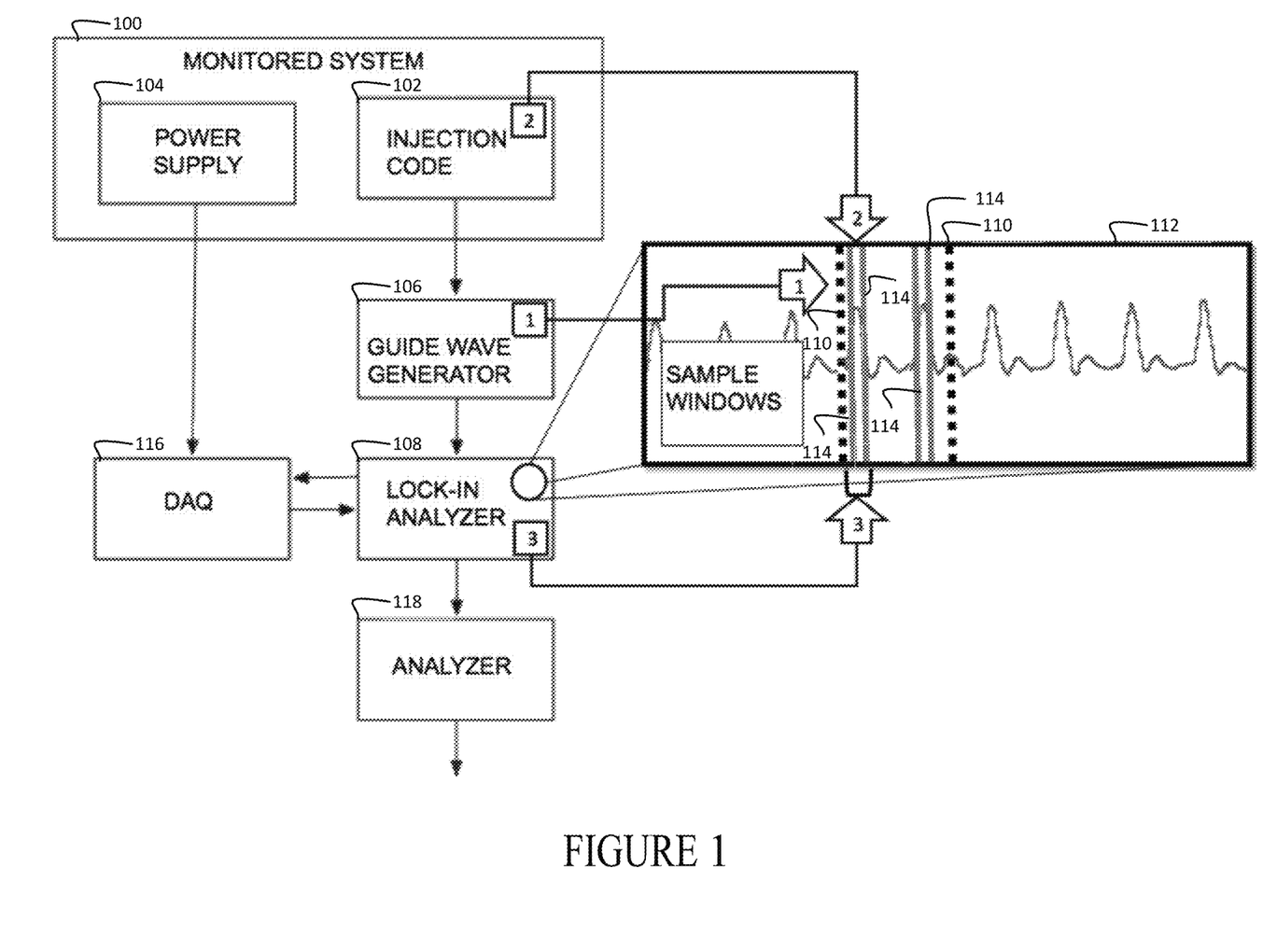
FIG. 1 is an exemplary detection system interfaced to a monitored system.

FIG. 1 shows a detection system interfaced to a server or a monitored device 100. The data-flow model begins by injecting a repetitive code 102 into the server or monitored device 100 (hereinafter referred to as a device or devices) that causes the malicious code on the monitored device 100 to render a detectable malicious profile on one or more voltage and/or current rails sourcing the monitored device 100 via the device's power supply 104. The code injection 102 is loaded onto the monitored device via an injection module 502 shown in FIG. 5. The code injection may comprise a small program that when executed causes the execution of a defined set of repetitive tasks, functions, or an Application Programming Interface (API) call functions that renders one or more distinctive power trace that may be analyzed and/or classified thereafter. The varying functions and lengths of execution of the injected code 102 may be static or dynamic running periodically, upon a device initialization, in response to a call function, and then going to sleep. The varying functions and lengths of execution of the injected code 102 are such that it causes a sufficient dataflow or sufficient load on the monitored device 100 to render a unique power profile. The injected code may enable the malicious code to run on top of it such that it becomes detectable via voltage, current, and/or power traces (referred to as the power traces).

Because no two operating states of a monitored device 100 consume the same amount of power or have exactly the same power traces, the distinctive characteristics generated by the malicious code can be revealed by the execution of the injected code. If the malicious code disables execution of some or all of the injected code, the malicious code may be detected by the absence of some or all of the distinctive power consumption patterns associated with the normal operation of the injected code as shown in the power traces. Because some infected devices consume detectably more power and require more time to execute than an uninfected device and because some malware consumes more system resources, execution of the injected code may reveal malware because it executes more resource-burning functions on top of or in response to the execution of the injected code. This causal chain reveals itself through an increase or decrease in power consumption that reveals itself in the power consumption patterns when compared to the device's own baseline power consumption traces that may be stored as power profiles in a buffer or a local and/or remote memory from the monitored device 100.

Figure 5:
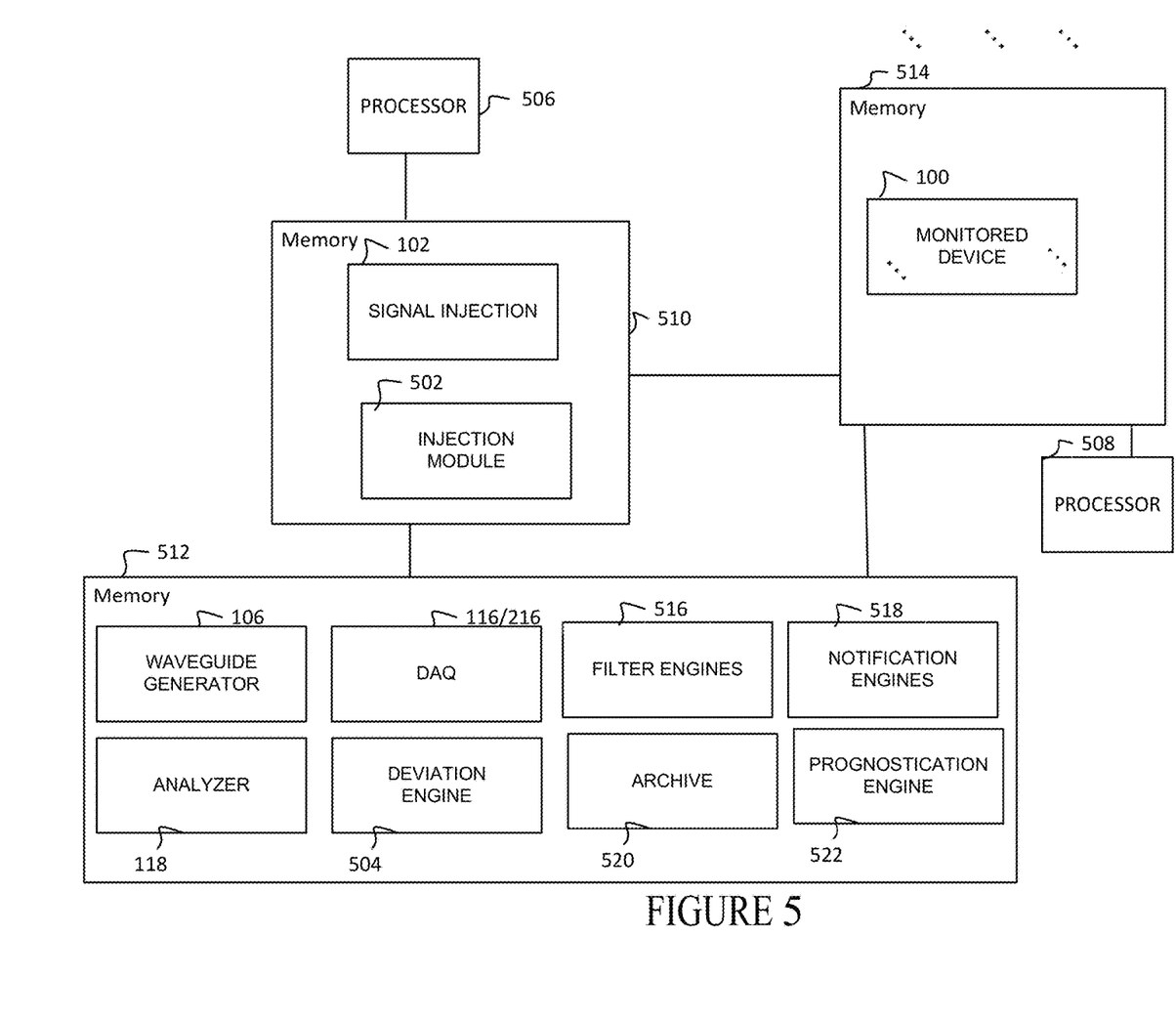
FIG. 5 is a fourth exemplary detection system interfaced to a monitored device.
Figure 6:
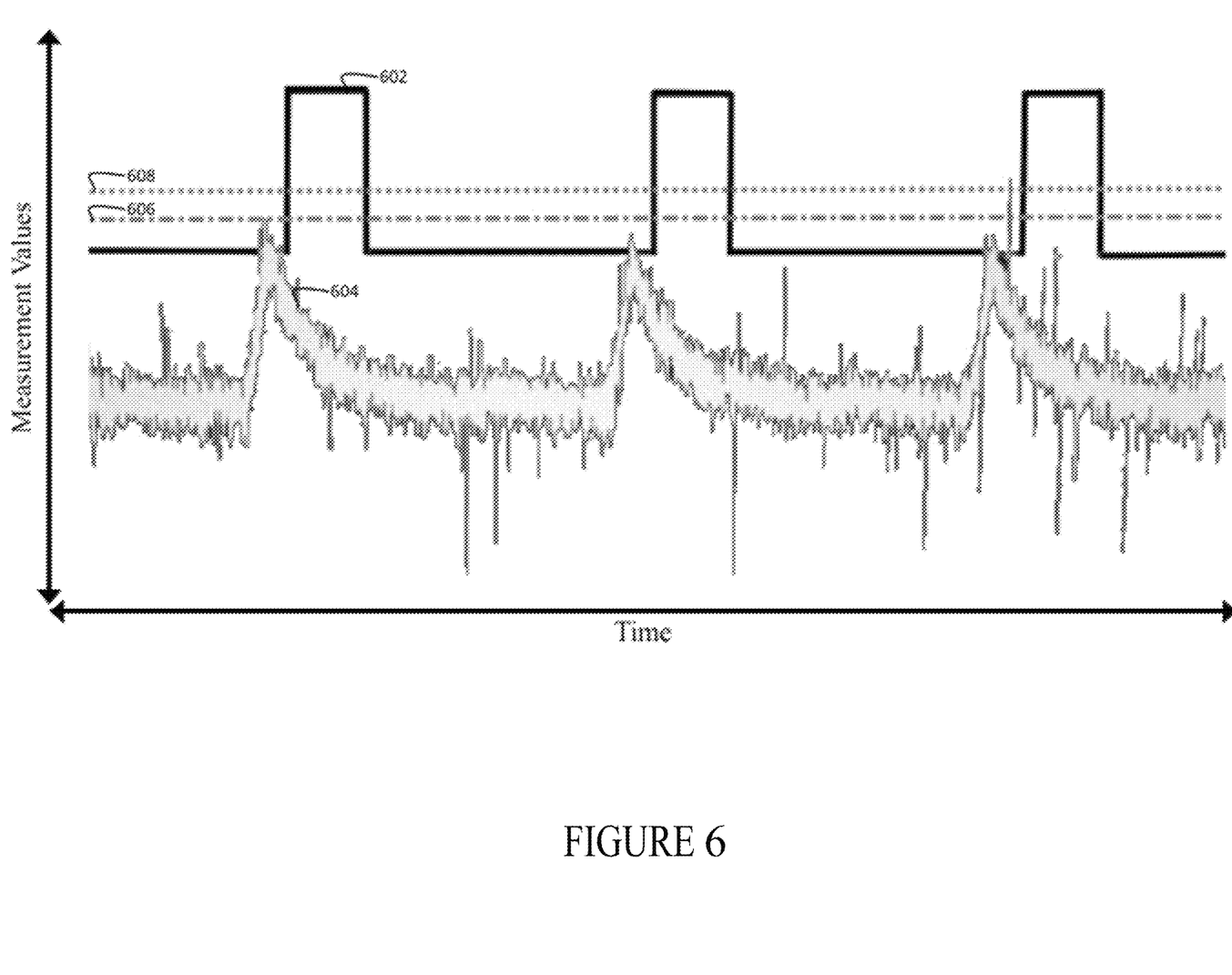
FIG. 6 shows a waveguide corresponding to an output of an analyzer.

In response to the initial execution of the injection code 102 (via the injection code module 502 of FIG. 5), a guide wave generator 106 generates a periodic signal in FIG. 1. Based on the guide wave's frequency and duty cycle, a lock-in analyzer 108 defines the adjustable observation window bounded by the solid lines 114 shown on display 112. Using the guide wave as an oscillating signal, the lock-in analyzer 108 (e.g., an extraction device) extracts, amplifies, and/or attenuates portions of the information encoded in the sampling intervals bounded by the solid lines 114 shown on optional display 112. While the sampling intervals are shown on display 112, the sampling of the power traces occurs from power supply 104 occurs via one or more sensors (not shown) that feed data acquisition device 116. The data acquisition device 116 extracts the current and/or voltage and/or power samples. Using a lowpass filter adjustable in cutoff frequency and order for demodulation and smoothing, the lock-in analyzer 108 measures the power of the signal over a predetermined interval, indicated by the dashed line 110, which in some systems is the standard deviation of the signal, and in other systems, is the square root of the average amplitude over the sampling interval, which is thereafter stored in a buffer. In some applications the aggregated data sums to a time-serial curve 604 as shown in FIG. 6 that represents the power consumption of monitored device during the execution cycles of the injected code.

An outlier or deviation engine 504 within analyzer module 118 or coupled to it execute a statistical detection analysis, referred to as an operating state-based detection that compares the actual monitored device's operating characteristics against its normal operating state characteristics without identifying any baseline factors from other devices or other data generated from other devices. For example, a probability density function that compares entropy between the monitored device's current operating state to its normal operating state and optionally calculates a Kullback-Leibler (KL) divergence function between the representations of the operating states may be automatically calculated by the analyzer module 118. When entropy and divergence are below one or more first predetermined entropy/divergence thresholds a normal operating state is identified. When entropy and divergence is above one or more second predetermined entropy/divergence thresholds that exceeds the first predetermined threshold and accounts for the tolerance and wear and tear, incubation periods are identified. When entropy and divergence are above one or more third predetermined entropy/divergence thresholds that is greater than the first and second threshold, an infectious state is identified. In some exemplary infected monitored devices, spikes are detected, changes in geometries are detected via entropy and divergence measures, and/or in others via lateral shifts in distributions detected via image comparisons identify infected devices.

An optional deviation engine 504 may generate or train deviation models such as a machine learning model, a vectorization and logistic regression model, for example, by training on data or training data indicative of a potentially infectious state. The data or training data may be generated before an infectious state fully occurs such as by training on data generated during incubation time periods that precedes the fully infectious state. The systems need not know or detect the complete symptoms or signs caused by the infectious software to detect or predict the monitored device's compromised or potentially compromised state provided by a prognostication engine 522 and execute health policies and/or rules. For example, when the disclosed system detects rootkits modifying an operating system so that it may later survive a system reset or a restoration to a recovery state, the aggregated data may represent the rootkit's transition or incubation state before it causes a full infection. In other words, the disclosed system may implement its health policies and rules in real-time or near real-time (analyzing data as fast or nearly as fast as the rate it is received) before the rootkit morphs or hide files, data, processes, network ports, etc. It may be detected and remediated before the monitored device 100 reveals a full infection, and in some systems, becomes contagious to other devices through direct or indirect communication. Rather, than spreading malware from one device to the next device, the deviation model generated by the deviation engine 504 may detect the incubating infection and isolate and/or remediate the monitored device before an infection matures. In some alternate systems, the deviation models are trained on training data generated before and after an infection matures and train on training data generated during the incubation time periods of the monitored device 100.

Figure 2:
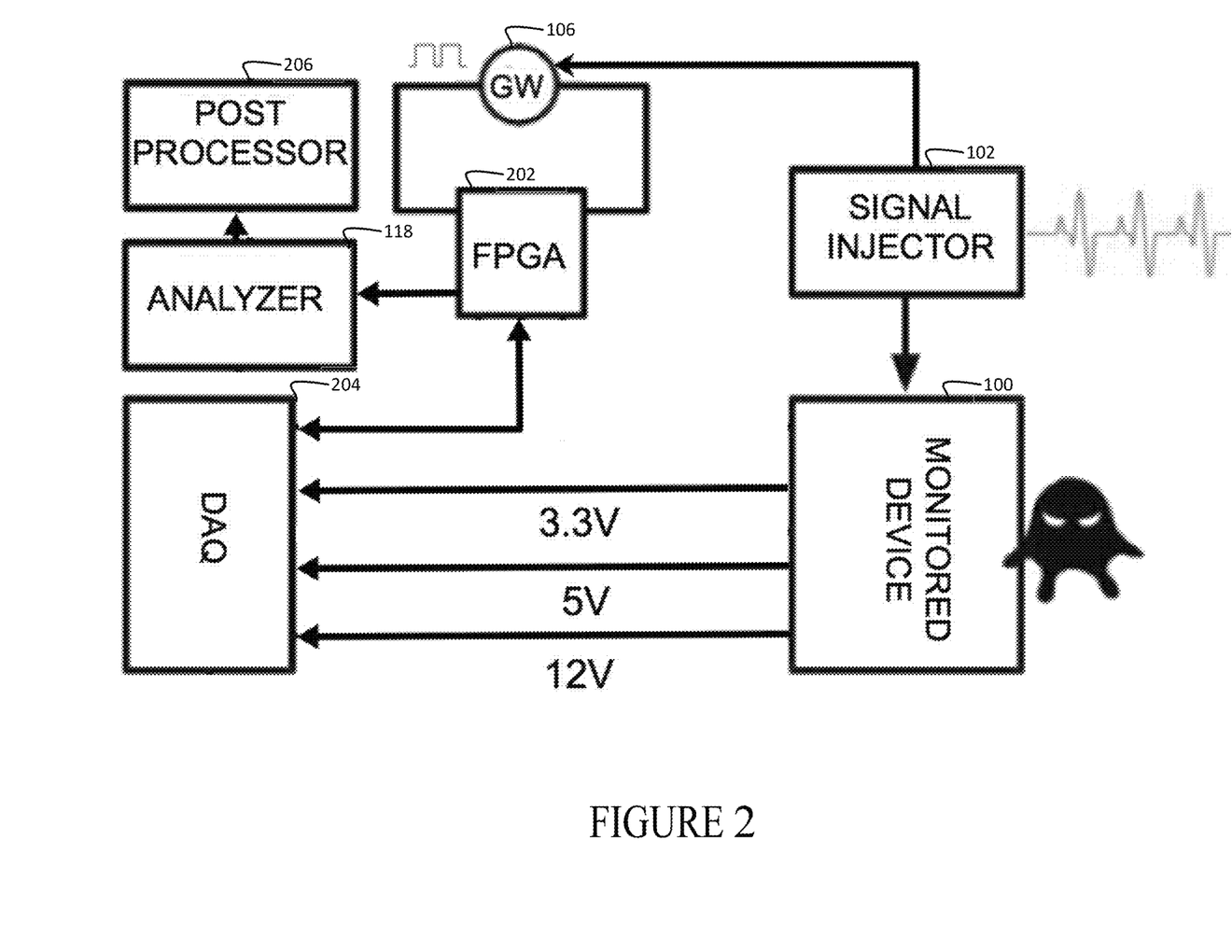
FIG. 2 is an alternate detection system interfaced to a monitored system.

FIG. 2 is a block diagram of another alternate system that detects infectious code. Like FIG. 1, a guide wave generator 106 generates a periodic reference signal in response to the injection code 102 generated by the injection code module 502. Based on the guide wave's frequency and duty cycle, a digital signal processor or a field-programmable gate array (FPGA) 202 operating in the digital domain defines the adjustable observation window. Using the guide wave as its oscillating signal, the FPGA 202 (e.g., an extraction device) extracts and amplifies some and/or attenuates other information encoded in the sampling intervals of power trace. In FIG. 2, the digital sampling of the multiple direct current power sources (three are shown) occurs at the digital data acquisition device 204 that senses, measures, and converts the analog current and/or voltage and/or power into respective digital data. Using logic blocks, the FPGA measures the current, voltage, and/or power of the signal over a predetermined interval, which in some applications is the standard deviation of the signal, and in other systems, the square root of the average over the sampling interval that are stored in a digital buffer. In some applications, the aggregated data sums to a time-serial curve that represents the power consumption that occurs during the execution of the injected code. The disclosed digital detection system of FIG. 2 may include a deviation engine 504 that may generate and/or train deviation models that predict monitored system states via the prognostication engine 522 and/or enforce health policies and rules in real time or near real time via the post-processor 206.

Figure 3:
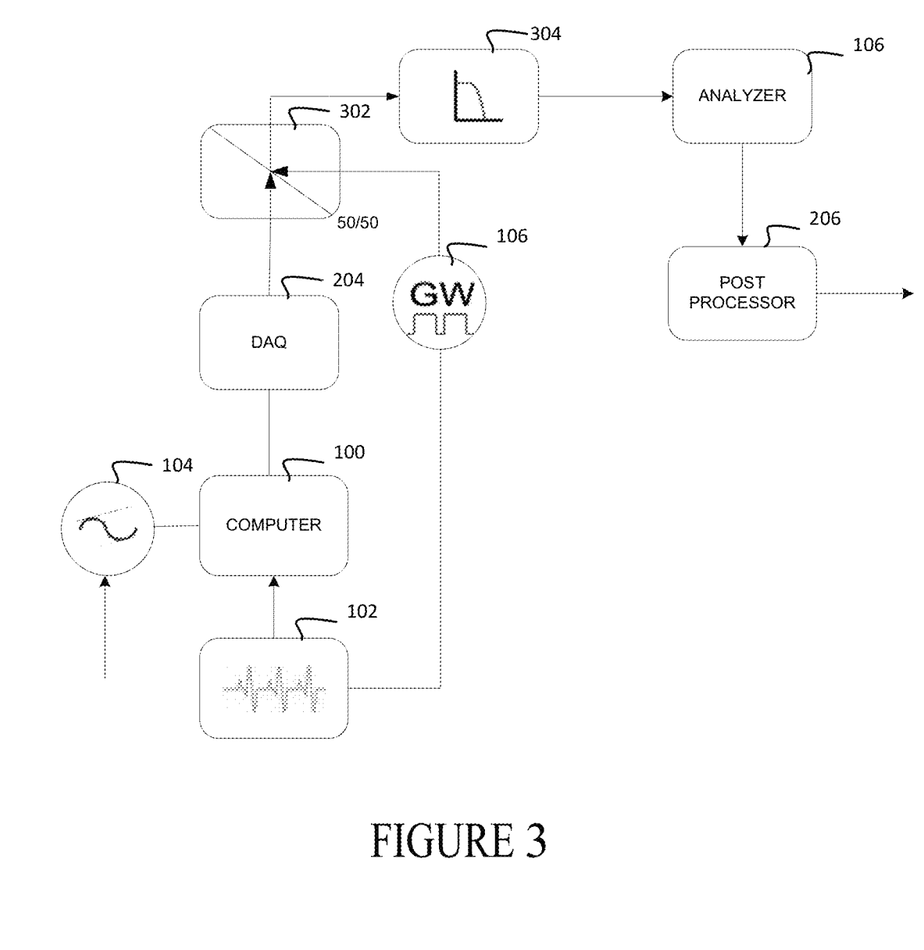
FIG. 3 is another alternate detection system interfaced to a monitored system.

FIG. 3 is a block diagram of another alternate detection system interfaced to a monitored system 100 that detects software specifically designed to disrupt, damage, or gain unauthorized access to a device. In FIGS. 3 and 5, the monitored device 100 is a computer. When powered by a power source 104, the monitored device 100 receives an injected signal from an injection code module 502. Based on the guide wave's frequency and duty cycle, a homodyne detector 304 defines the adjustable observation window. The homodyne detector 304 (e.g., an extraction device) feeding one or more lowpass filters 306 with adjustable cut-off frequencies and filter orders extract the power sourced signal even in extremely noisy environments. The homodyne detector 304 and the one or more lowpass filters 306 extract, amplify, and/or attenuate information sampled from the direct current source samples of the monitored device 100. Sampling occurs through the data acquisition device 116 that detects, measures, and converts the current and/or voltage and/or power into samples. The homodyne detector 304 measures the power of the direct source signal over a predetermined interval during the signal injection period, which in some applications is the standard deviation of the signal, and in other systems, the square root of the average power over the sampling interval. The power measurement is stored in a remote and/or local buffer from the monitored device 100, which in some applications may be aggregated to render a time-series curve that represents the power consumed by the monitored device 100 during the execution of the injected code. Storage in a local and/or remote buffer is not a matter of design choice, but instead is based on IT department operating policies and/or the amount of damage the monitored device sustained. In some IT applications health policies and rules seek to rapidly minimize the number of infected hosts and prevent further damage to the host and thus and isolate potential hosts before malware incidents are validated. In such circumstances, remote analysis and validation may occur while the suspect device is isolated or under quarantine. In some applications, the health policies and rules reflect levels of acceptable risk.

A deviation engine 504 or outlier detector within the analyzer module 118 or coupled to it execute the operating state-based detection that compares the actual monitored device's operating characteristics against its normal operating state characteristics without identifying any baseline factors from other devices or other data generated from other devices. The deviation engine 504 may execute a probability density function that compares entropy between the monitored device's current operating state against its normal operating state and may also calculate divergence like the exemplary algorithms described herein.

The post processor's deviation engine 504 of FIG. 3 may generate or train deviation models such as a machine learning model, a vectorization and logistic regression model based on a desired application for example, by training on training data generated before and after an infectious state of the monitored device occurs and by training on training data generated during incubation time periods that precedes a fully infectious state of the monitored device 100. The deviation models may be executed by the prognostication engine 522 that predicts via present indicators described herein a potentially infected state. In response to a detection or prediction, the deviation engine 504 (like each deviation engine described herein) may determine when to drain traffic from an infected device, when to notify a cluster, a router, and/or controlling system of a potentially infected operating state, when an infected device should stop receiving new processing or operating sessions, and determine when to let running or operating sessions to expire.

Figure 4:
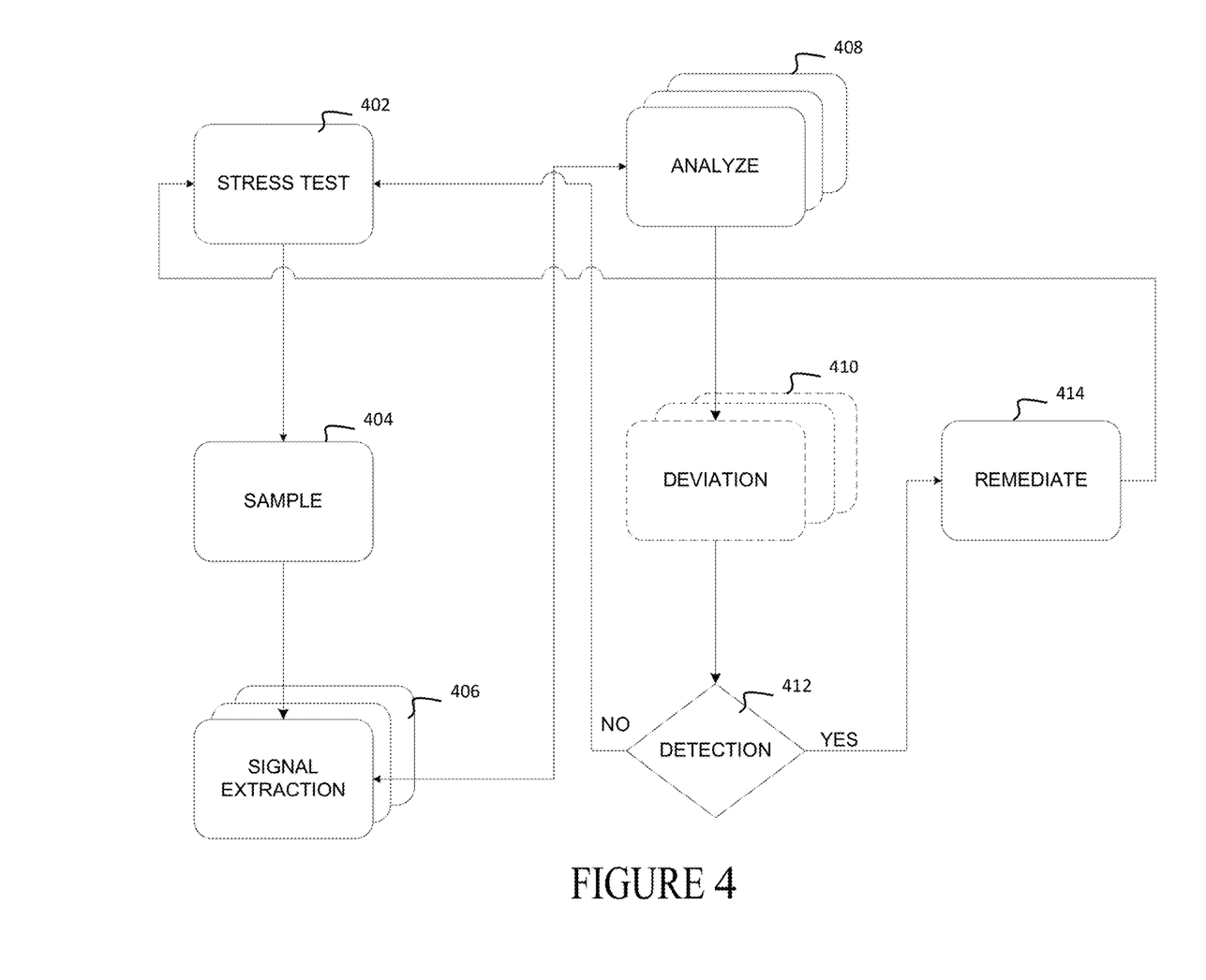
FIG. 4 is a process flow that detects software designed to disrupt, damage or gain unauthorized access to a monitored device.

FIG. 4 is a process flow that detects software designed to disrupt, damage or gain unauthorized access to a monitored device. In response to the initial execution of the injection code 102, a guide wave generator 106 generates a periodic reference signal to induce a stress test on the monitored device 100 at 402. Based on the guide wave's frequency and duty cycle, an adjustable observation window is defined at 404. Using the guide wave as its oscillating signal, the process extracts and amplifies and/or attenuates information encoded in the sampling intervals of direct current power sources at 406. The process measures the power of the source signal over a predetermined interval at 406 too, which in some processes is the standard deviation of the signal, and in other processes, the square root of the average over the sampling interval that are stored in a buffer. In some processes the aggregated data sums to a time-serial curve that represents the power consumption of the injected code.

A deviation process executes a statistical detection analysis, referred to as an operating state-based detection process that compares the actual monitored device's operating characteristics against its normal operating state characteristics without identifying any baseline factors from other processes or other data generated from those processes at 408. For example, a probability density process that compares entropy between the monitored device's current operating state to its normal operating state and may also calculates a Kullback-Leibler (KL) divergence between the representations of the operating states may be automatically calculated. When entropy and divergence are low (e.g., below a predetermined entropy/divergence threshold), a normal operating state is identified. When entropy and divergence is statistically higher (e.g., above a second predetermined entropy/divergence threshold that exceeds the first predetermined threshold and accounts for the component tolerances and wear and tear), incubation periods are identified. When entropy and divergence are high (e.g., above a third predetermined entropy/divergence threshold that is greater than the first and second threshold) an infectious state is identified. Here, the measure of entropy and divergence provide a tri-state detection (e.g., a three state detection). In some exemplary infected monitored devices, spikes are detected, changes in geometries are detected via entropy and divergence measures, and lateral shifts in distributions are detected.

An optional deviation process 410 (shown in dashes in FIG. 4) may generate or train deviation models such as a machine learning model training on data generated before an infectious state of the monitored device occurs and by training on data generated during incubation time periods that precedes a fully infectious state of the monitored device. The optional processes 410 need not know or detect the complete symptoms or signs caused by the infectious software to detect or predict the monitored device's compromised state and execute health policies processes and/or processes that enforce the rules. For example, when the disclosed process detects rootkits modifying an operating system so that it may later survive a system rest or a restoration to a recovery state, the aggregated data may represent the transition or incubation state before a complete infection occurs. In other words, disclosed process may implement its health policy processes and rule enforcements in real-time or near real-time before the rootkit is able to morph or hide files, data, processes, network ports, etc. It may be detected or predicted at 412 by the systems and processes described above and remediated at 414 via the health policies and/or rules before the monitored device 100 is fully infected, and in some systems, becomes contagious to other devices through direct or indirect communication. Rather, than spreading malware from one device to the next, the disclosed deviation model may detect the incubating infection and isolate and/or remediate the infected device (e.g., remove the infected code, restore the functionality and data of the host, and remove the temporary confinement/quarantine measures) before the process repeats. In some alternate processes, the deviation models are trained on training data generated before and after an infectious state and train on training data generated during incubation time periods that precedes the fully infectious state. In some other alternate processes, the process executes a post-infection and/or post-remediation assessment as part of its recovery process to prevent similar incidents from reoccurring.

FIG. 5 is a block diagram of an alternate automated system that may execute the process flows and characteristics described above and those shown in FIGS. 1-4 to detect infectious software code. The system comprises processors 506 and 508, a non-transitory media such as a memory 510-514 (the contents of which are accessible by processor 506 and 508), a monitored device 100 and an Input/output interface (I/O interface—not shown). The I/O interface connects devices and local and/or remote applications such as, for example, additional local and/or remote monitored devices. The memory 510-514 stores instructions in a non-transitory media, which when executed by the processors 506 and 508, causes the automated detection system to render some or all of the functionality associated with predicting an infectious event such as an exposure to infectious software, for example. The memory 510-514 stores instructions, which when executed by the processors 506 and 508, causes the automated system to render functionality associated with the signal injection 102 and 502, the wave guide generator 106, the Data Acquisition Device (DAQ) 116 and/or 216, the filter (low-pass) engines 516, the notification engines 518 (providing notifications of various operating states and remediated states), the analyzer 118, the deviation engine 504, a prognostication engine 522, and an infectious event archive or log 520. In yet another alternate automated detection system, the non-transitory media provided functionality is provided through cloud storage. In this automated detection system, cloud storage provides ubiquitous access to the system's resources and higher-level services that can be rapidly provisioned over a distributed network. Cloud storage allows for the sharing of resources to achieve consistent services across many monitored devices at many local and remote locations and provides economies of scale.

The memory 510-514 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 510-514 may comprise a single device or multiple devices that may be disposed on one or more dedicated memory devices or disposed on a processor or other similar device. An "engine" comprises a processor or a portion of a program executed by a processor that executes or supports event detection and infection predictions. When functions, steps, etc. are said to be "responsive to" or occur "in response to" another function or step, etc., the functions or steps necessarily occur as a result of another function or step, etc. It is not sufficient that a function or act merely follow or occur subsequent to another.

FIG. 6 shows an exemplary wave guide 602 that amplifies the power traces that lie within the sampling intervals bounded by the solid lines 114 shown on display 112 in FIG. 1 and flatten the power traces lies outside of the sampling window and flattens the and noise that lies in the sampling window. When the wave guide 602 (shown as a square wave) reaches a maximum amplitude it amplifies a portion of the power trace in the sampling window and when it reaches a minimum amplitude it attenuates or flattens portions of the power trace in the sampling window. In FIG. 6, when the transient spikes (potential infectious states identified) exceed a first predetermined amplitude threshold 606 or a second predetermined amplitude threshold 608 shown by the dashed lines in the drawing, the system may diagnose the monitored device 100 as exposed to or infected by software and/or a virus and institute the health polices and/or rules described herein via the deviation engine 504. In this disclosure, each of the engines described as well as the term itself describes a hardware device like a processor that executes specific software code that manages and manipulates data as programmed to execute the functionality associated with it.

The functions, acts or tasks illustrated in the FIGS. or described may be executed in a digital and/or analog domain and in response to one or more sets of logic or instructions stored in or on non-transitory computer readable medium or media. The functions, acts or tasks are independent of the particular type of instructions set, storage media, processor or processing strategy and may be performed by software, hardware, integrated circuits, firmware, microcode and the like, operating alone or in combination. The systems may also include the systems and processes described in U.S. Ser. No. 15/980,045, titled System and method for monitoring Power Consumption to Detect Malware that is owned by the assignee of this application, and is incorporated by reference in its entirety.

The systems are an improvement over known technique. The detection systems do not collect power profile signatures as is done in known profile-matching systems. Such systems, like known code-matching systems, recognize infections by first identifying them in other infected devices. The detection systems, exceed these processes by harnessing and focusing in on the unique and distinctive properties of the device it is actually monitoring. The detection systems are less invasive and may detect invasive software such as malware and viruses in real time. The improved speed and accuracy of the detection systems are produced through data flow models and post-processing. The systems automate signal isolation in hardware and model deviations from its own customized baseline of operation derived from the monitored system itself.

In some systems, the system models train on data when an infection initially occurs but before a full infection occurs. These systems generate complete intermediate representations or models of an exposed system that can identify unknown forms of malicious code even before the malicious code forces the device into a noticeable or unsecure state. This occurs at least by detecting operating states during incubation periods.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A non-transitory computer-readable medium having stored thereon software instructions that, when executed by a processor, cause the processor to:
   injecting, by an injection module, a repetitive software code that causes a malware in a monitored device to render a detectable direct current power consumption profile;
   generating, by a guide wave generator, a guide wave signal that establishes an observational window, that is applied to data that represent a direct current source power consumption of a monitored device;
   extracting, by an extraction device, a portion of the data that represent the direct current source power consumption of the monitored device;
   comparing, by a deviation engine, a plurality of operating characteristics of the monitored device against a plurality of normal operating state characteristics of the monitored device without identifying a baseline factor from a second device or identifying a second data generated from the second devices; and
   identifying, by the deviation engine based on the comparing, the malware on the monitored device, without processing data associated with a prior identification of the malware or identifying a source of the malware or identifying a location of the malware on the monitored device.

2. The non-transitory computer-readable medium of claim 1 where repetitive software code causes the execution of a plurality of repetitive tasks that render a distinctive power trace.

3. The non-transitory computer-readable medium of claim 1 where repetitive software code causes the execution of a plurality of application programming interface call functions that render a distinctive power trace.

4. The non-transitory computer-readable medium of claim 1 where the data renders a representation of the direct current source power consumption of a monitored device during the execution of the repetitive software code.

5. The non-transitory computer-readable medium of claim 4 where the guide wave causes the extraction device to amplify a portion of the representation of the direct current source power consumption extracted by the extraction device.

6. The non-transitory computer-readable medium of claim 5 where the guide wave causes the extraction device to attenuate a second portion of the representation of the direct current source power consumption extracted by the extraction device.

7. The non-transitory computer-readable medium of claim where the comparing comprises an execution of a probability density algorithm.

8. The non-transitory computer-readable medium of claim 7 where the comparing comprises an execution of an entropy algorithm.

9. The non-transitory computer-readable medium of claim 1 further comprising generating, by the monitored device, training data indicative of a potential infectious state without identifying the malware.

10. The non-transitory computer-readable medium of claim 9 further comprising training a deviation model on the data indicative of the potential infectious state.

11. The non-transitory computer-readable medium of claim 9 where the training data is generated during an incubation state before a full infection state occurs.

12. The non-transitory computer-readable medium of claim 9 further comprising draining traffic from the monitored device when the deviation model predicts a potentially infected operating state.

13. The non-transitory computer-readable medium of claim 9 further comprising notifying a server cluster when the deviation model predicts a potentially infected operating state.

14. The non-transitory computer-readable medium of claim 9 further comprising determining when the monitored device should stop receiving a new processing session when the deviation model predicts a potentially infected operating state.

15. The non-transitory computer-readable medium of claim 9 further comprising determining when to allowing an operating session to expire when the deviation model predicts a potentially infected operating state.

16. The non-transitory computer-readable medium of claim 9 further comprising determining when to allowing an operating session to expire when the deviation model predicts a potentially infected operating state.

17. The non-transitory computer-readable medium of claim 9 where identifying, by a deviation engine, the malware on the monitored device occurs when a rendered signal exceeds a predetermined threshold.

18. The non-transitory computer-readable medium of claim 9 where the extraction device comprises a lock-in analyzer that operates in an analog domain.

19. The non-transitory computer-readable medium of claim 9 where the extraction device comprises a field programmable array that operates in a digital domain.

20. The non-transitory computer-readable medium of claim 9 where the extraction device comprises a homodyne detector.

21. A method of detecting infectious software code, comprising:
injecting, by an injection module, a repetitive software code that causes a malware in a monitored device to render a detectable direct current power consumption profile;
generating, by a guide wave generator, a guide wave signal that establishes an observational window, that is applied to data that represent a direct current source power consumption of a monitored device;
extracting, by an extraction device, a portion of the data that represent the direct current source power consumption of the monitored device;
comparing, by a deviation engine, a plurality of operating characteristics of the monitored device against a plurality of normal operating state characteristics of the monitored device without identifying a baseline factor from a second device of identifying a second data generated from the second devices; and
identifying, by the deviation engine based on the comparing, the malware on the monitored device, without processing data associated with a prior identification of the malware or identifying a source of the malware or identifying a location of the malware on the monitored device.

22. A system that detects infectious software code, comprising:
an injection module that injects a repetitive software code that causes a malware in a monitored device to render a detectable direct current power consumption profile;
a guide wave generator that generates a guide wave signal that establishes an observational window that is applied to data that represent a direct current source power consumption of a monitored device;
an extraction device that extracts a portion of the data that represent the direct current source power consumption of the monitored device; and
a deviation engine that
compares a plurality of operating characteristics of the monitored device against a plurality of normal operating state characteristics of the monitored device without identifying a baseline factor from a second device or identifying a second data generated from the second devices to render a comparison, and detects based on the comparison, the malware on the monitored device, without processing data associated with a prior identification of the malware or identifying a source of the malware or identifying a location of the malware on the monitored device.

23. The method of claim 21 where the comparing comprises using a probability density function that compares entropy between the monitored device's current operating state to the monitored device's normal operating state.

24. The system of claim 22 where the comparison uses a probability density function that compares entropy between the monitored device's current operating state to the monitored device's normal operating state.

* * * * *

UNITED STATES PATENT AND TRADEMARK OFFICE
CERTIFICATE OF CORRECTION

PATENT NO. : 11,074,345 B2  
APPLICATION NO. : 16/427109  
DATED : July 27, 2021  
INVENTOR(S) : Joel Dawson et al.

Page 1 of 1

It is certified that error appears in the above-identified patent and that said Letters Patent is hereby corrected as shown below:

In the Claims

Claim 7, Column 10, Line 52. "The non-transitory computer-readable medium of claim" should be changed to -- The non-transitory computer-readable medium of claim 1 --

Claim 8, Column 10, Line 56. "7 where" should be changed to -- 1 where --

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*